July 17, 1934.  L. HEYMAN  1,966,721
PUREER
Filed Oct. 11, 1933
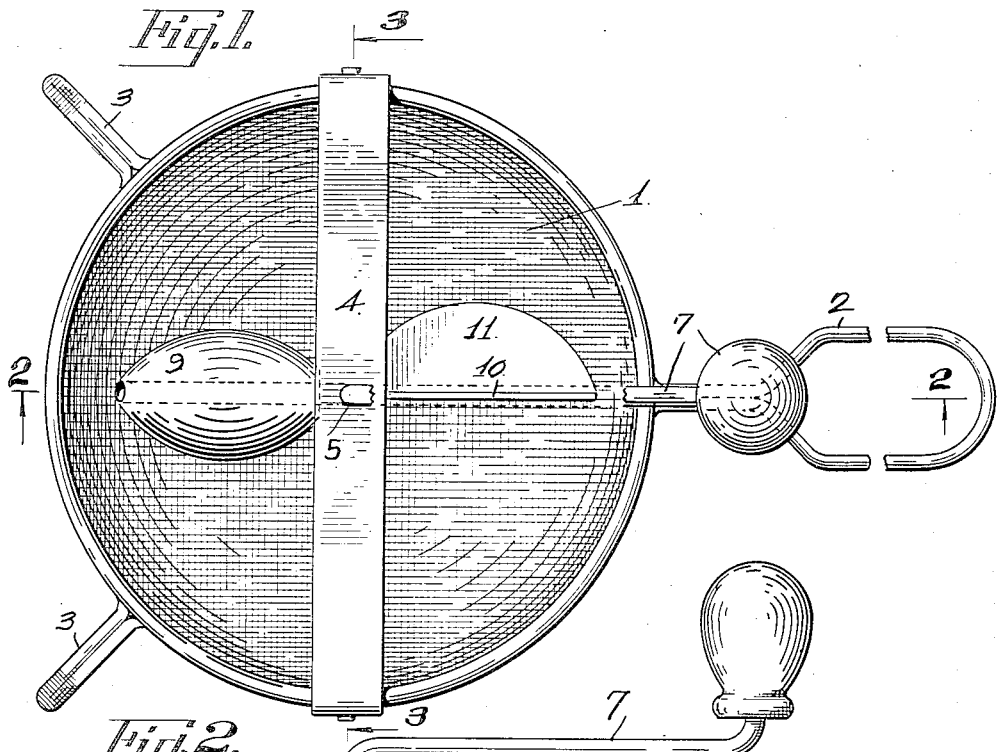
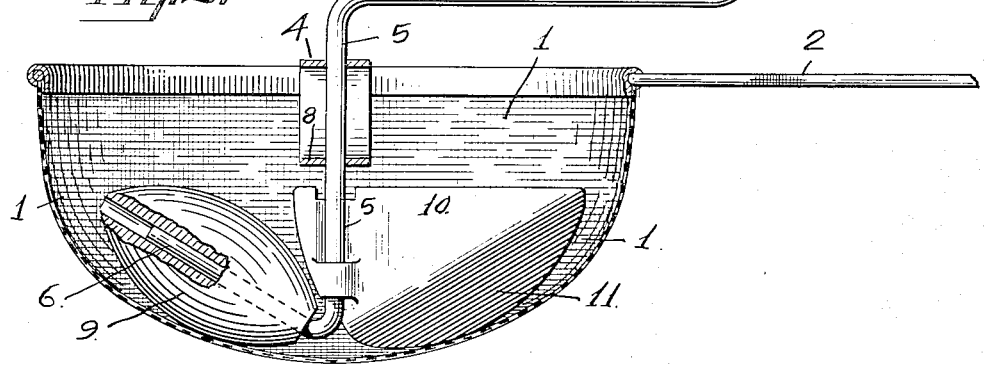
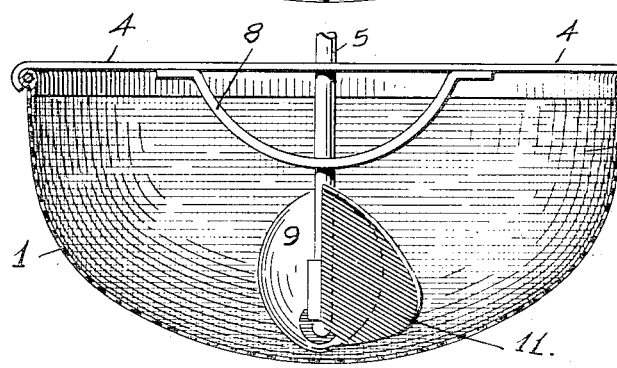
INVENTOR.
LAURENCE HEYMAN.
BY Arthur L. Slee
HIS ATTORNEY.

Patented July 17, 1934

1,966,721

UNITED STATES PATENT OFFICE 1,966,721

PUREER

Laurence Heyman, San Francisco, Calif.

Application October 11, 1933, Serial No. 693,092

1 Claim. (Cl. 146—175)

My invention relates to improvements in pureers or fruit and vegetable crushers wherein a rotatable shaft detachably mounted in axial relation with the inside of a semispherical strainer is provided with an ovoid crushing element slidably and rotatably mounted upon a lateral extension of said shaft and operates in conjunction with an extruding element mounted upon the shaft opposite the crusher for moving the contents to be crushed into the path of the crusher and also for extruding crushed portions of said contents through the strainer.

The primary object of the present invention is to provide a new and improved article of manufacture comprising an improved pureer for crushing fruit and vegetable matter and for separating the crushed portion by extruding the same through the meshes of the strainer, during the crushing process.

Another object is to provide a new and improved article of manufacture of the character set forth having a rotatably and slidably mounted crushing element arranged to automatically adjust itself to the contour of the inner surface of a semispherical or other suitably shaped strainer whereby the contents of said strainer may be more efficiently and effectively crushed.

A further object is to provide improved means for separating the crushed portion of the contents by extruding said crushed portion through the meshes of said strainer during the crushing process.

A still further object is to provide crushing and extruding elements which may be easily detached and removed from the strainer for facilitating the cleansing of said elements.

I accomplish these and other objects by the device disclosed in the drawing, in which—

Fig. 1 is a partially broken plan view of the improved article of manufacture;

Fig. 2 is a transverse sectional view taken on line 2—2 of Fig. 1 in the direction indicated; and Fig. 3 is another transverse sectional view taken on line 3—3 of Fig. 1 in the direction indicated.

Referring to the drawing:

The numeral 1 is used to designate a hollow and preferably semispherical strainer having the usual handle 2 on one side and lateral extensions 3 on the opposite side thereof, said handle 2 and extensions 3 operating as a support by means of which said strainer 1 may be suitably suspended within the top of a pot, pan, or other article, not shown, to receive the crushed matter extruded from said strainer.

A bar 4 is detachably mounted across the open top of the strainer 1 and a vertically disposed shaft 5 is rotatably and slidably mounted within or through said bar and coaxially with the strainer 1. The lower or inner end of said shaft 5 is provided with a lateral extension 6 at the lower end thereof, said extension being preferably inclined approximately parallel with and in spaced relation to the adjacent strainer surface, the purpose of which will hereinafter be more fully set forth.

The upper end or portion of the shaft 5 is provided with a suitable handle 7 by means of which said shaft 5 may be rotated.

The bar 4 is provided with an arcuate brace or extension 8 preferably on the under side thereof, as disclosed in Fig. 3 of the drawing, through which the shaft 5 is also rotatably and slidably mounted.

This arcuate extension serves the double purpose of providing a more adequate bearing to keep the shaft 5 coaxial with the strainer 1 and also to limit the upper movement of the shaft 5 in order that the elements thereon may be effectively retained in proper engaging relation with the contents of the strainer 1.

Rotatably and slidably mounted upon the lateral extension 6 of the shaft 5 is an ovoid crusher element 9 said crusher 9 being rotatably mounted upon said extension 6 in order that it may more effectively roll over and crush the strainer contents against the inner surface of said strainer. The crushing element 9 is also slidably mounted upon said extension 6 in order that it may readily and automatically adjust itself, during operation, to the inner surface of the strainer 1 and the contents resting thereagainst.

On the opposite side of the shaft 5 from the crusher 9 I have rigidly secured to said shaft 5 what I term an extruder which consists of a laterally extending plate 10 having an inclined portion 11 also arranged similarly to the crusher 9, approximately in parallel relation to the adjacent inner surface of the strainer 1, as disclosed in Fig. 2 of the drawing.

In operation, fruit, vegetables, or other matter to be crushed, is placed within the strainer 1 and the shaft 5 is rotated, by means of the handle 7, in a clock-wise direction. This rotating revolves the crusher 9 and extruder 11 and as the crusher 9 revolves it encounters and crushes the contents of the strainer 1 and the inclined extruder 11, following within the path of the crusher, extrudes through the interstices of the said strainer 1 such crushed matter as may be encountered by said extruder while traversing its circuit within and against the interior surface of said strainer 1.

The operation is continued until all avaliable or extrudable matter has become separated from the contents of the strainer 1, after which the residue is removed from the strainer, the bar 4 removed and the crusher 9 removed from its extension or bearing 6 when the said crusher 9 as well as the plate 10, may be effectively and easily cleaned and restored, ready for a subsequent operation.

I claim:

In a new article of manufacture, a pureer comprising a hollow semispherical strainer; a supporting bar detachably mounted across the open top of said strainer; a shaft rotatably mounted within said bar and extending axially into said strainer and having a laterally inclined extension on said inner end and a handle for rotating said shaft on the outer end thereof; an ovoid crusher slidably and rotatably mounted upon said extension for engaging the inner surface of the strainer and crushing contents thereof; and an inclined extruding plate mounted upon the inner end of said shaft opposite the lateral extension thereon for moving said contents into the path of the ovoid crusher and also for extruding crushed portions of said contents through said strainer.

LAURENCE HEYMAN.